United States Patent [19]

Downer et al.

[11] 4,129,618
[45] Dec. 12, 1978

[54] TETRAFLUOROETHYLENE POLYMERS

[75] Inventors: John M. Downer, Harpenden; William G. Rodway, Welwyn; Lawrence S. J. Shipp, Stevenage, all of England

[73] Assignee: Imperial Chemical Industries Limited, London, England

[21] Appl. No.: 755,843

[22] Filed: Dec. 30, 1976

Related U.S. Application Data

[62] Division of Ser. No. 510,571, Sep. 30, 1974, Pat. No. 4,038,231.

[30] Foreign Application Priority Data

May 16, 1974 [GB] United Kingdom .............. 21748/74

[51] Int. Cl.² .......................................... C08L 27/18
[52] U.S. Cl. .................................. 260/884; 264/127
[58] Field of Search .................... 260/884, 29.6 F; 526/247, 253, 255

[56] References Cited

U.S. PATENT DOCUMENTS

| | | | |
|---|---|---|---|
| 3,654,210 | 4/1972 | Kuhls et al. | 260/29.6 F X |
| 3,770,711 | 11/1973 | Hartig et al | 526/247 X |
| 3,855,191 | 12/1974 | Doughty, Jr. et al. | 256/247 X |
| 3,864,322 | 2/1975 | Yallourakis | 526/247 X |
| 3,911,072 | 10/1975 | Saito et al. | 526/247 X |

*Primary Examiner*—Carman J. Seccuro
*Attorney, Agent, or Firm*—Cushman, Darby & Cushman

[57] ABSTRACT

A tetrafluoroethylene polymer comprising primary particles having core and shell portions, the core portion comprising tetrafluoroethylene polymerised in the presence of a perfluoroalkyl or alkoxy trifluoro-ethylene comonomer, particularly hexafluoropropylene, and shell portion consisting of tetrafluoroethylene homopolymer, or a copolymer of tetrafluoroethylene in which the comonomer concentration is less than half that in the core portion.

2 Claims, No Drawings

TETRAFLUOROETHYLENE POLYMERS

This is a division, of application Ser. No. 510,571 filed Sept. 30, 1974, now U.S. Pat. No. 4038231.

This invention relates to particulate high molecular weight polymers based on tetrafluoroethylene and methods of making them.

The production of aqueous colloidal dispersions by polymerising tetrafluoroethylene, optionally in the presence of comonomers or modifiers, using a free radical catalyst in an aqueous medium containing a suitable surfactant is well known. These dispersions may be used after further stabilisation or concentration for applications involving impregnation or coating of surfaces. Alternatively the dispersions can be coagulated by mechanical agitation of the dispersions to produce powders. These powders may be fabricated into articles such as rods, tapes, tubes, pipes, films and wire coatings by a paste extrusion process in which a mixture of the polymer powder and a lubricant, such as a liquid hydrocarbon, is forced under pressure, at temperatures of about 30° C., from a cylinder fitted with an exit die. The lubricant may subsequently be removed by drying or by extraction in a bath containing a solvent for the lubricant. Subsequently, the extrudate of polytetrafluoroethylene may be sintered to substantially eliminate the voids left by removal of the lubricant and provide a stronger, more coherent article.

New polymers based on tetrafluoroethylene have now been developed which exhibit advantages in some applications, particularly applications involving paste extruded products.

Accordingly there is provided an aqueous dispersion of a tetrafluoroethylene polymer comprising colloidal particles containing at least 98% by weight, preferably at least 99.5% by weight, of polymerised tetrafluoroethylene and polymerised therewith at least one copolymerisable monomer selected from perfluoroalkyl trifluoroethylenes and perfluoroalkoxy trifluoroethylenes each having from 3 to 10 carbon atoms said particles having inner core and outer shell portions in which the weight concentration of copolymerised material present in the outer shell portion (relative to the weight concentration of tetrafluoroethylene with which it is polymerised) is less than half that of the inner core portion. Preferably the outer shell of the particles consists essentially of polytetrafluoroethylene. The weight ratio of the polymer forming the shell to that forming the core may be between 1:99 and 99:1. Preferably the weight ratio of shell to core material is between 5:95 and 95:5, desirably between 5:95 and 80:20.

The composition of the shell and inner portions of the particles are not normally uniform along a diameter of the particle unless the concentration of the reactants are maintained constant during the polymerisation process. The concentrations of copolymerised monomers present in the shell and core portions referred to in this specification are to be taken as the average weight concentration in the shell and core portions respectively. The layered particles of the invention include cases in which the inner portion itself is formed by the polymerisation of monomeric constituents which are changed in stepwise fashion during the polymerisation so that there are present more than one layer of different compositions which individually need not necessarily contain any of the copolymerised monomers provided that the overall weight concentration of the copolymerised monomer in the inner portion is at least twice that of the outer shell portion.

Powder products are readily obtained from the dispersions of the invention by the conventional technique of coagulating the dispersion in the presence of air, followed by drying the coagulated product.

The powder products of the invention are particularly useful in applications which require high strength products in the unsintered form. In the paste extrusion process previously described the tensile strength of the product can be varied for a given polymer by varying the ratio of the cross sectional area of the cylinder containing the lubricated polymer to the cross-sectional area of the die through which the lubricated polymer is forced. When this ratio, hereinafter termed the reduction ratio, is increased the greater will be the pressure, hereinafter termed the extrusion pressure, required to extrude the polymer through the die. When other conditions are kept constant the result of increasing the extrusion pressure is that the tensile strength of the extrudate increases. The products of the present invention have exceptionally high extrusion pressures even at low reduction ratios.

The extrusion pressures of the polymers of the invention are characterised by the extrusion pressure obtained under standardised conditions as hereinafter defined. Particularly useful products may be obtained from the products of the invention when the extrusion pressure according to the standard test specified is at least 50 $MN/m^2$ and preferably at least 65 $MN/m^2$, measured using a die of land diameter 0.226 cm.

The invention further provides a process for the preparation of an aqueous dispersion of a tetrafluoroethylene polymer comprising polymerising tetrafluoroethylene, optionally together with a copolymerisable monomer selected from perfluoroalkyl or perfluoroalkoxy trifluoroethylenes having from 3 to 10 carbon atoms, in the presence of a preformed dispersion of polymer particles containing at least 98% of units of tetrafluoroethylene and a copolymerised monomer of the type defined, the concentration, if any, of the copolymerisable monomer or monomers used in the polymerisation process being such that the weight concentration of the copolymerisable monomer or monomers relative to polymerised tetrafluoroethylene present in the polymer formed in the polymerisation process is less than half that present in the preformed dispersion, whereby the preformed dispersion particles comprise an inner core portion and the subsequently polymerised materials comprise an outer shell portion of the particles of the dispersion resulting from the process.

It will be appreciated that the copolymerisable materials specified for use in this invention are much less reactive than tetrafluoroethylene so that the actual weight concentration of copolymerisable material relative to tetrafluoroethylene present in monomeric form during the reaction will need to be very much higher than that required in the polymerised material. In particular, when a copolymerisable monomer as specified is used to produce a shell portion of the particle having a concentration of copolymerisable material to tetrafluoroethylene of less than half that of the preformed core portion it may be necessary that the weight concentration of the copolymerisable monomer to tetrafluoroethylene in the monomeric polymerisation mixture for the shell polymer is considerably greater than the weight concentration of polymerised monomer units to tetrafluoroethylene units present in the preformed polymer.

The weight concentration of copolymerisable monomer relative to tetrafluoroethylene used in forming the product of the invention must however be such that the total weight concentration of the copolymerisable material in the product is less than 2% and preferably less than 0.5% by weight of the product.

It is preferred for simplicity of operation that the process consists of two stages only, a first stage in which tetrafluoroethylene and one or more of the specified copolymerisable monomers are polymerized together throughout the whole of the first stage, and a second stage in which the concentration of copolymerisable monomer in the reactants is reduced or eliminated so that the polymer formed in the second stage contains less than half the concentration of copolymerised monomer formed in the first stage. Preferably the second stage uses tetrafluoroethylene without any significant quantity of other comonomer being present.

The preformed dispersion may be prepared in a separate polymerisation process in which a dispersion, hereinafter termed a "seed" dispersion is prepared having a desired quantity of copolymerised monomer and is then stored as a stable dispersion for subsequent use in the process of the invention. Alternatively both the polymerisation of the preformed dispersion and the polymerisation of the material forming the outer shell portion may be carried out as a single process in one reaction vessel with an intermediate stage in which the concentration of comonomer in the gaseous phase is reduced or eliminated so that the comonomer content of the polymer formed in the last stage of the polymerisation does not exceed the prescribed limit.

It will be appreciated that the final shell stage of the polymerisation can be carried out in the presence of all or only some of the first stage preformed dispersion, and may also be carried out with or without the addition of extra water. In general the polymerisation of the monomers in the second stage results in growth of the particles of the preformed dispersion so that these increase in diameter without formation of new particles composed only of the materials used in the second stage of the process. Some new particles composed only of the monomers of the shell stage polymerisation may be formed and it is to be understood that the products of the present invention may include some of this type of particle. The use of varying proportions of a seed dispersion from a first stage dispersion together with added water to reduce the number of primary particles per unit volume of aqueous phase permits the production of a wide range of polymer dispersions varying in average particle diameter. Thus, in the preparation of final dispersions of a given solids content and of a given volume the use of a relatively small quantity of seed dispersion together with a relatively large quantity of water will provide a final dispersion of larger particle size than the use of a relatively large quantity of seed dispersion together with a small quantity of water. By variation of the proportion of seed dispersion used as the aqueous phase a range of dispersions of different average particle size may be formed. These dispersions give products having a range of physical properties, such as extrusion pressure.

As previously indicated a major advantage of the invention is that it enables fluorocarbon polymers of high extrusion pressure to be produced This extrusion pressure is greater for a given set of polymerisation and polymer recovery conditions, that is emulsifier content of the polymerisation medium, catalyst type and concentration, drying temperature of the coagulated polymer etc., than would be the case for a homopolymer or a copolymer polymerised under conditions where no layered structure of dissimilar composition is formed. This surprising feature cannot be achieved merely by blending dispersions of homopolymers and of a copolymer of tetrafluoroethylene and the specified copolymerisable monomers in amounts sufficient to give an overall polymer composition equivalent to that of the polymers of the invention.

The increased extrusion pressures obtainable from the products obtained according to the invention results in a corresponding increase in the tensile strength of unsintered extrudates of the polymer.

In selecting the most suitable copolymerisable monomer, consideration must be given to the cost, availability, ease of handling and effect on all the physical properties of products containing the selected modifier. Conveniently the comonomer should be of a type which can be readily removed from the reaction medium when desired and for this reason comonomers which are gaseous at temperatures at which the dispersions are stable are preferred. Of the trifluoroethylenes the lower perfluoroalkyl compounds, in particular hexafluoropropylene, have the greatest utility.

The concentration of comonomer charged with the tetrafluoroethylene in the stage of preparing a seed dispersion will vary widely depending on the particular comonomer selected. In the case of hexafluoropropylene it is preferred to use between 100 parts per million and 20,000 parts per million expressed relative to the weight of aqueous phase. With less reactive comonomers up to 50,000 parts per million may be used.

Suitable reaction rates are obtained by maintaining a tetrafluoroethylene pressure of between about 0.3 and 3.0 MN/m$^2$ in the gas space of the reaction vessel above the aqueous phase, although lower or higher pressures may be employed. The weight concentration of tetrafluoroethylene relative to the aqueous phase will depend on the relative volumes of the gas space and the aqueous phase and to a lesser extent on the temperature employed. For example, for a system in which a vessel contains 70% by volume of an aqueous phase maintained at 70° C. the pressure range referred to above is equivalent to a range of about 0.5 to 6.0 parts by weight of TFE relative to the aqueous phase. The weight ratio of copolymerisable monomer to tetrafluoroethylene used in preparing the core portion is preferably in the range 1:10 to 1:100.

Whilst it is preferred that the shell portion is formed essentially of tetrafluoroethylene, when a copolymerisable monomer is present during formation of the shell the concentration must be such as to give a polymerised concentration in the shell of not more than half that of the core. To achieve this polymerised concentration the weight ratio of copolymerised monomer of tetrafluoroethylene in the gas phase should be not more than about half the weight ratio employed in forming the core material.

The weight concentration of the materials forming the core and the shell of the particles may vary widely. Surprisingly a noticeable increase in extrusion pressure is observed when as little as 1% by weight of the total weight of the particles is in the form of core material. Equally surprisingly the effect is still observed when only 1% by weight of polytetrafluoroethylene relative to the total weight of particles forms the shell material. It is preferred for optimum increase in extrusion pressure that the shell homopolymer should constitute not less than 5% and not more than 95% by weight of the total weight of the particles.

The techniques for preparing the aqueous dispersions of the invention are basically those known in the art and a typical polymerisation system includes emulsifier, catalyst and a stabilising saturated hydrocarbon wax material, but for optimum increase in extrusion pressure several preferred conditions of operation are employed. Conditions should be chosen such as to ensure that the extrusion pressure of the seed material, measured when isolated as a powder, is as high as possible because such seed dispersions give rise to polymers of the highest extrusion pressure after being coated with a polymer shell in accordance with the method of this invention.

The emulsifier chosen should preferably be a fully-fluorinated material because emulsifiers containing a significant number of hydrogen atoms cause retardation of the polymerisation rate. The materials are preferably long chain carboxylic acids or sulphonic acids having either linear or branched chains, optionally in the form of ammonium or alkali metal salts of the acids. The ammonium salt of perfluorooctanoic acid is particularly preferred. The concentration of emulsifier used has a significant effect on the particle size of the dispersion produced and on the extrusion pressure. The use of the preferred emulsifiers in the range 0.05-0.5% by weight based on the aqueous charge is the most suitable because such concentrations give rise to basic seed dispersions from which relatively high extrusion pressure powders can be obtained.

The catalyst used is any water-soluble, free-radical catalyst, disuccinic acids peroxide and ammonium or potassium persulphate being preferred. These should also be used at concentrations which will give rise to seed dispersions, the isolated polymers of which would have high extrusion pressures, and in general should be used at as low a concentration as is consistent with obtaining an acceptable reaction rate.

The dispersions of the invention are preferably prepared in vigorously stirred reaction vessels using for example a technique in which tetrafluoroethylene is charged to a vessel containing the selected modifier and the aqueous phase with dissolved emulsifier and catalyst and an insoluble saturated hydrocarbon material as an aid to stabilising the polymerising dispersion. In a typical procedure tetrafluoroethylene is charged to give an initial pressure of about 2.1 MN/m$^2$ and is maintained at about this pressure by the addition of further tetrafluoroethylene as polymerisation proceeds. When the desired amount of polymerisation has occured the unpolymerised tetrafluoroethylene and any unpolymerised comonomer can be completely removed and the resulting dispersion may then be stored for use in a subsequent polymerisation in which further tetrafluoroethylene is polymerised in the presence of the dispersion. Alternatively, the second stage may be commenced immediately with the addition of further tetrafluoroethylene under the same or similar high pressure conditions as previously used. In either case it is preferred that substantially all the comonomer used in the first stage of the polymerisation has been consumed or removed before the second polymerisation stage commences. In the case of comonomers which are gases at room temperature this is achieved by removing the pressurised tetrafluoroethylene from the vessel at the end of the first stage of the polymerisation. Optionally, the volume above the aqueous phase in the reaction vessel may be evacuated to remove substantially all traces of the gaseous modifier.

When it is required to produce a high extrusion pressure polymer having a comonomer present in both the core and shell portions of the particles, the concentration of the comonomer in the shell being less than half that in the core, this is readily accomplished, if the modifier is gaseous at the reaction temperature of the polymerisation, by removing only part of the unpolymerised gaseous phase after the production of the core particles and then repressurising the gas phase by the addition of tetrafluoroethylene so that the weight ratio of comonomer relative to tetrafluoroethylene is then not more than about 50% by weight of the weight ratio that was present in the gas phase in the preparation of the seed particles.

The dispersions obtained from the process of the invention may be readily coagulated and dried to give fine powders. It is known that the temperature of drying has a significant effect on the extrusion pressure of polytetrafluoroethylene coagulated dispersion powders. To obtain high extrusion pressures from the powders of the present invention they should be dried at as high a temperature as possible. This temperature is normally less that about 280° C. because above this temperature the powders can be damaged in such a way flaws and faults are observed when the products are extruded.

The aqueous dispersion resulting from the process of the invention may be used as a dispersion for coating or impregnation applications but more normally is coagulated to a fine powder and dried for use in the paste extrusion process. Materials such as pigments or fillers may be added to the dispersion before coagulation. Coagulation is effected by mechanical agitation in the presence of air.

The powder products obtained by use of the invention find use in several applications. The powder may be extruded in the form of rods, tubes or coatings which may or may not be subjected to a sintering process. A particularly useful application is the conversion of an unsintered extruded rod into unsintered tape, including low density porous tapes by processes known in the art. In these processes the high tensile strengths obtainable from the products of the present invention not only facilitate the production of the tapes but give rise to a tape with enhanced physical properties.

The extrusion pressure of the powders were determined by a standard test as follows. A sample of powder was conditioned below 20° C. for a period of not less than 16 hours and then sieved through a British Standard 8 mesh sieve. 175 g of this powder was placed in a 1 liter bottle and 44 ml of a liquid hydrocarbon lubricant known as "Isopar" H (obtainable from the Esso Chemical Co. Ltd) was added from a burette. ("Isopar" H is a hydrocarbon distillate having a viscosity of 1.31 cP and a boiling range of 171° C. to 191° C.) This gave a composition containing 16% by weight of lubricant. The bottle was sealed and rolled for 30 minutes and then stored at 25° C. for not less than 4 hours. The sample was then slowly preformed to a pressure of 2.03 MN/m$^2$ over a period of 5 minutes into a cylinder 3.8 cm in diameter. The preform was held at this pressure for a further 5 minutes. The preform was then extruded at 30° C. by a hydraulic extruder using a linear ram speed of 2.03 cm per minute, through dies having land diameters of 0.226, 0.350, 0.426 cm respectively each having a land length of 0.95 cm and an included angle of 20°. The ratio of the cross-sectional area of the barrel of the extruder to the cross-sectional area of the three dies is 282, 118 and 80:1 respectively. The pressure required to extrude the polymer is measured by means of a pressure transducer.

The invention is illustrated by the following Examples of which Example 5 is by way of comparison. All parts are parts by weight unless otherwise noted.

EXAMPLE 1

A series of polymerisations was carried out in a stirred, horizontally disposed autoclave having a water capacity of 1,430 parts according to the following procedure. Into the autoclave were charged 1,000 parts distilled water, 10 parts of paraffin wax, 2 parts of ammonium perfluorooctanoate and 0.3 parts of disuccinic acid peroxide. The autoclave contents were heated to 75° C. and then evacuated for 5 minutes to remove oxygen dissolved in the water. A vacuum of about 45 cm of mercury was obtained. The vacuum was then reduced by exactly 30 cm by admitting hexafluoropropene. The autoclave was then pressurised to 2.1 MN/m$^2$ (300 psig) with tetrafluoroethylene. A polymerisation reaction ensued almost immediately as indicated by a drop in the pressure of the autoclave. After the pressure had fallen to a value of 1.8 MN/m$^2$ (260 psig) the autoclave was repressurised with tetrafluoroethylene to 2.1 MN/m$^2$. This procedure was repeated as necessary until the required amount of polymerisation had been effected.

Using this standard procedure a series of polymerisations was carried out in which, after a required amount of polymer had been formed in the presence of hexafluoropropene, the gas space in the autoclave was vented and evacuated so that substantially all the unreacted hexafluoropropene was removed from the system. The autoclave was then repressurised with tetrafluoroethylene and the polymerisation continued so that the polymer formed after the removal of hexafluoropropene was essentially in the form of the homopolymer. After completion of the polymerisation the dispersions were coagulated and dried at 240° C. The table below lists the weight of copolymer formed relative to the weight of homopolymer formed for each experiment of the series. Also listed are the extrusion pressures obtained using the various extrusion tests previously described.

| Run | Total Solids (%) | Ratio of TFE/HFP polymer: TFE polymer (wt %) | Extrusion Pressures (MN/m$^2$) | | | HFP content |
|---|---|---|---|---|---|---|
| | | | 0.226 cm die | 0.350 cm die | 0.426 cm die | |
| 1# | 35.3 | 100 : 0 | 59.1 | 25.5 | 17.5 | 0.11 |
| 2 | 35.0 | 94 : 6 | 81.2 | 31.5 | 19.6 | 0.10 |
| 3 | 35.3 | 71 : 29 | 84.0 | 30.4 | 22.4 | 0.08 |
| 4 | 34.6 | 30 : 70 | 93.8 | 22.5 | 21.7 | 0.05 |
| 5 | 33.0 | 15 : 85 | 84.0 | 30.4 | 21.7 | 0.03 |
| 6* | 32.2 | 0 : 100 | 57.4 | 24.5 | 16.4 | — |

Control run in which the whole polymerisation was conducted in the presence of the single initial charge of HFP, without an HFP removal stage.
*Control run in which no hexafluoropropene was used.

The hexafluoropropylene contents were determined by the usual infra red technique. The value quoted (as weight percent) is the product of 0.3 and the ratio of the absorbance of a cold pressed sample about 0.5 mm thick at 10.18 microns to the absorbance at 10.7 microns.

The results indicate that the addition of a relatively small amount of a homopolymer shell significantly increases the extrusion pressure and that the inclusion of a small amount of a TFE/HFP copolymer core has a similar effect.

EXAMPLE 2

A horizontally-disposed autoclave provided with a paddle stirrer and having a water capacity of 1,430 parts was charged with 1,000 parts water, 10 parts paraffin wax and 1 part ammonium perfluorooctanoate. The temperature of the autoclave contents were raised to 75° C. and the autoclave was evacuated to a vacuum of about 45 cm of mercury. Hexafluoropropene was introduced to reduce the vacuum by 30 cms and the autoclave was pressurised with tetrafluoroethylene to a pressure of 1.9 MN/m$^2$. 0.3 parts disuccinic acid peroxide dissolved in 3 parts water were injected into the autoclave. Polymerisation ensued and the autoclave pressure was maintained at about 1.9 MN/m$^2$ by adding further tetrafluoroethylene until 163 parts of polymer had been formed. The autoclave was then repressurised with tetrafluoroethylene to a pressure of 1.9 MN/m$^2$ and a further 90 parts of polymer was formed. The autoclave was then vented to atmospheric pressure. The polymer formed in this second stage of the polymerisation was essentially of polytetrafluoroethylene.

The weight average particle size of the dispersion formed was found by election microscopy to be 0.11 microns. The dispersion was separated from the paraffin wax and coagulated by mechanical agitation and dried at 240° C. The extrusion pressure of the polymer measured using the 0.226 cm diameter die under the standard test conditions specified was found to be 77 MN/m$^2$.

EXAMPLE 3

A series of polymerisations was carried out to investigate the effect of only partially removing the hexafluoropropene from a system similar to that of Example 1. Into a stirred, horizontally disposed autoclave having a water capacity of 1,430 parts were charged 860 parts of distilled water, 43 parts paraffin wax, 1.3 parts ammonium perfluorooctanoate, 0.86 parts disuccinic acid peroxide. The autoclave contents were heated to 70° C. and the autoclave was evacuated to give a vacuum of about 50 cm mercury. Hexafluoropropene was then introduced to give a pressure of 5 psi (0.03 MN/m$^2$) and the autoclave was then pressurised to 2.1 MN/m$^2$ using tetrafluoroethylene. The autoclave temperature was raised to 85° C. and further tetrafluoroethylene was added each time the pressure dropped to 1.8 MN/m$^2$ to restore the pressure to 2.1 MN/m$^2$. In the experiments tabulated below the hexafluoropropylene was either completely or partially removed by venting according to the details given in the table with a subsequent increase in pressure to 2.1 MN/m$^2$ using tetrafluoroethylene as in Example 1. The polymers obtained were isolated and dried as in Example 1. The point at which the hexafluoropropene was vented is expressed as a percentage of the total polymer content. The amount of HFP removed is indicated by recording the autoclave pressure after venting.

| Run | HFP venting point % | Autoclave Pressure reduced to (MN/m$^2$) | Total Solids Content | Extrusion Pressure# (MN/m$^2$) |
|---|---|---|---|---|
| 7 | 33 | 1.05 | 35.2 | 98.0 |
| 8 | 33 | 0.35 | 32.6 | >140.0 |
| 9 | 70 | 0 | 31.2 | >140.0 |

-continued

| Run | HFP venting point % | Autoclave Pressure reduced to (MN/m²) | Total Solids Content | Extrusion Pressure# (MN/m²) |
|---|---|---|---|---|
| 10* | 100 | — | 35.0 | 84.0 |

*In run 10 the HFP was present throughout the polymerisation.
These results were obtained in accordance with the test specified except in that the die had a land diameter of 0.127 cm and a land length of 0.95 cm.

These results indicate that a significant increase in extrusion pressure occurs even when the shell polymer is prepared in the presence of appreciable quantities of hexafluoropropene.

EXAMPLE 4

A series of polymerisations was carried out in which the polymerisation of tetrafluoroethylene was conducted in the presence of various quantities of a seed dispersion made by polymerising tetrafluoroethylene in the presence of hexafluoropropylene. The seed dispersion was prepared in a horizontally disposed autoclave having a water capacity of 1,430 parts using the following ingredients listed below and the techniques described in Example 1:

1,000 parts water
10 parts paraffin wax
1 part ammonium perfluorooctanoate
0.3 parts disuccinic acid peroxide Hexafluoropropene (30 cm) was charged as in Example 1 and the addition of tetrafluoroethylene at an autoclave pressure of 2.1 MN/m² was continued until a solids content of 20% was obtained.

Several batches of dispersions made to the above recipe were blended together. The HFP content of the blend was 0.13% by weight. Aliquots of the dispersion obtained were mixed with distilled water in the various proportions tabulated below. Polymerisations were conducted using these dispersions in the following manner. The dispersion was charged to the same autoclave used for preparing the seed dispersions together with 10 parts of paraffin wax and 0.1% by weight of ammonium perfluorooctanoate based on the weight of distilled water added to the seed dispersion. The autoclave was then heated to 75° C. and the autoclave evacuated to remove oxygen from the system. The autoclave was raised to a pressure of 2.1 MN/m² using tetrafluoroethylene and after polymerisation commenced the addition of tetrafluoroethylene was continued until the solids content of the dispersion had reached about 20%. The gas phase was then vented and the dispersions coagulated by mechanical agitation. The powders obtained were dried at 240° C. The extrusion pressures of the powders and tensile strengths of extrudates were measured according to the test procedures previously described.

| Run No. | Volume of seed dispersion (1) | Volume of distilled water | TFE/HFP copolymer in final polymer (nominal %) | Solids Content % | Extrusion Pressure (MN/m²) 0.226 cm die | Extrusion Pressure (MN/m²) 0.350 cm die |
|---|---|---|---|---|---|---|
| 11 | 0 | 7.0 | 0 | 22.0 | 49.7 | 22.4 |
| 12 | 0.35 | 6.65 | 5 | 20.7 | 57.4 | 24.5 |
| 13 | 0.70 | 6.3 | 10 | 21.6 | 62.3 | 26.9 |
| 14 | 1.4 | 5.6 | 20 | 20.6 | 72.1 | 30.4 |
| 15 | 2.1 | 4.9 | 30 | 20.0 | 74.2 | 31.5 |
| 16 | 2.8 | 4.2 | 40 | 22.9 | 69.3 | 32.5 |
| 17 | 3.5 | 3.5 | 50 | 21.4 | 53.5 | 24.5 |
| 18 | 4.2 | 2.8 | 60 | 23.0 | 39.5 | 18.5 |
| 19 | 4.9 | 2.1 | 70 | 19.8 | 28.0 | 18.5 |
| 20 | 5.6 | 1.4 | 80 | 19.4 | 22.7 | 15.7 |
| 21 | 6.3 | 0.7 | 90 | 20.4 | 22.7 | 14.7 |
| 22 | 6.650 | 0.35 | 95 | 20.2 | 19.6 | 13.6 |
| 23 | 7.0 | 0 | 100 | 20.0 | 19.6 | 14.7 |

EXAMPLE 5

The effect of varying the TFE/HFP polymer content of a mixture of TFE/HFP polymer and TFE homopolymer was investigated by blending polymer dispersions of the two types in the various proportions shown in the table. The copolymer dispersion was prepared according to the procedure of Example 1 except in that only 1 part of ammonium perfluorooctanoate was used and hexafluoropropene was present throughout the reaction. The HFP content of the copolymer was 0.14% by weight. The homopolymer dispersion was prepared in the same manner except in that no hexafluoropropene was present. Blends of the dispersions were coagulated in the usual manner and dried at 240° C. The results obtained from the various blends are tabulated below.

| Run No. | Concentration of TFE/HFE copolymer in blend (%) | Extrusion Pressure (MN/m²) 0.226 cm die | Extrusion Pressure (MN/m²) 0.350 cm die |
|---|---|---|---|
| 24 | 0 | 56.7 | 24.5 |
| 25 | 3 | 57.4 | 24.5 |
| 26 | 6 | 55.7 | — |
| 27 | 15 | 57.4 | 24.5 |
| 28 | 28 | 59.1 | 25.9 |
| 29 | 42 | 56.7 | 24.5 |
| 30 | 56 | 57.4 | 28.0 |
| 31 | 64 | 55.7 | 28.7 |
| 32 | 84 | 56.7 | 28.7 |
| 33 | 94 | 54.6 | 25.9 |
| 34 | 97 | 52.1 | 24.5 |
| 35 | 100 | 55.3 | 28.7 |

The results indicate that although there is a random variation in the extrusion pressure results there is no indication of a significant increase in extrusion pressure as a result of blending the dispersions.

EXAMPLE 6

A series of polymerisations was carried out using the procedure of Example 1 except in that the polymerisation was interrupted in each case when the solids content of the dispersion had reached 10% solids content. At this point various quantities of the gas phase containing HFP were removed so that the pressure remaining in the vessel in each particular case was as tabulated below. The pressure was then restored to 2.1 MN/m² by the addition of tetrafluoroethylene and the polymerisation procedure was continued with addition of tetrafluoroethylene until the solids content had reached about 35% by weight. At this stage the dispersions were coagulated and the products dried in the normal way. A drying temperature of 240° C. was used.

The HFP contents and the extrusion pressures of the polymers obtained are tabulated below together with values of the relative concentrations of HFP produced in the two stages of the polymerisation, that is in the core and shell portions of the particles.

| Run | Total Solids (%) | Pressure of HFP/TFE mixture after venting (MN/m$^2$) | HFP content of final polymer (wt. %) | Ratio of HFP content in core: shell | Extrusion Pressure (MN/m$^2$) 0.426 cm die |
|---|---|---|---|---|---|
| 36* | 36.0 | — | — | — | 16.8 |
| 37 | 35.8 | 0 | 0.045 | 0.16/0 | 20.6 |
| 38 | 35.0 | 0.105 | 0.050 | 0.16/0.008 | 21.7 |
| 39 | 34.0 | 0.21 | 0.052 | 0.16/0.008 | 20.6 |
| 40 | 35.9 | 0.31 | 0.050 | 0.16/0.008 | 19.6 |
| 41 | 35.1 | 0.70 | 0.085 | 0.16/0.06 | 18.9 |
| 42 | 34.8 | 1.085 | 0.106 | 0.16/0.084 | 14.7 |

*Control run in which no HFP was used, the remaining ingredients as detailed in Example 1 being reacted to 36.0% solids without interruption for any venting.

It is observed from these results that high extrusion pressures are obtained even when substantial amounts of hexafluoropropylene are polymerised in the shell portion of the particles, providing that the HFP content of the shell portion is less than half that of the HFP content of core portion. In run 42 where this limit was exceeded the extrusion pressure obtained was less than the control run 36 containing no HFP.

EXAMPLE 7

The procedure of Example 1 was repeated to provide materials containing low levels of the HFP/TFE copolymer core and a TFE homopolymer shell. The results obtained are recorded in the table below.

| Run | Ratio of TFE/HFP polymer : TFE polymer (wt. %) | Total Solids (%) | Extrusion Pressure (MN/m$^2$) | | |
|---|---|---|---|---|---|
| | | | 0.226 cm die | 0.350 cm die | 0.426 cm die |
| 43 | 6 : 94 | 34.0 | 87.0 | 28.7 | 20.3 |
| 44 | 3 : 97 | 33.5 | 85.0 | 29.4 | 20.3 |

High values of extrusion pressure were obtained by comparison with Run 1 and Run 6 of Example 1.

We claim:

1. A tetrafluoroethylene polymer powder suitable for extrusion containing at least 98% of polymerised tetrafluoroethylene and polymerised therewith at least one coplymerisable monomer selected from perfluoroalkyl trifluoroethylens and perfluoroalkoxy trifluoroethylenes each having from 3 to 10 carbon atoms, said powder being composed of particles having inner core and outer shell portions in which the weight concentration of copolymerised monomer present in the outer shell portion (relative to the weight concentration of tetrafluoroethylene with which it is copolymerized) is less than half that of the inner core portion and characterised in that the extrusion pressure of the powder is at least 50 MN/m$^2$, said extrusion pressure being measured at 30° C. with a ram speed of 2.03 cm per minute at a reduction ratio of 282:1 wherein the extradate is a mixture of the powder and a hydrocarbon lubricant which mixture contains 16 percent by weight of the hydrocarbon lubricant, said lubricant having a viscosity of 1.31 cP and a boiling range of 1.71° C. to 1.91° C.

2. A tetrafluoroethylene polymer powder according to claim 1 in which the copolymerised monomer is hexafluoropropylene.

* * * * *

UNITED STATES PATENT AND TRADEMARK OFFICE
CERTIFICATE OF CORRECTION

PATENT NO. : 4,129,618
DATED : December 12, 1978
INVENTOR(S) : John Michael Downer et al.

It is certified that error appears in the above-identified patent and that said Letters Patent are hereby corrected as shown below:

Claim 1, last line, change "1.71° C. to 1.91° C."
to read -- 171° C. to 191° C. --.

Signed and Sealed this

Twenty-fifth Day of November 1980

[SEAL]

Attest:

SIDNEY A. DIAMOND

Attesting Officer

Commissioner of Patents and Trademarks